Feb. 15, 1949.  D. S. WILLSON  2,462,044
COMPOUND MOTION DISTRIBUTING VALVE FOR
EXPANSIBLE CHAMBER METERS
Filed Dec. 23, 1944  6 Sheets-Sheet 1
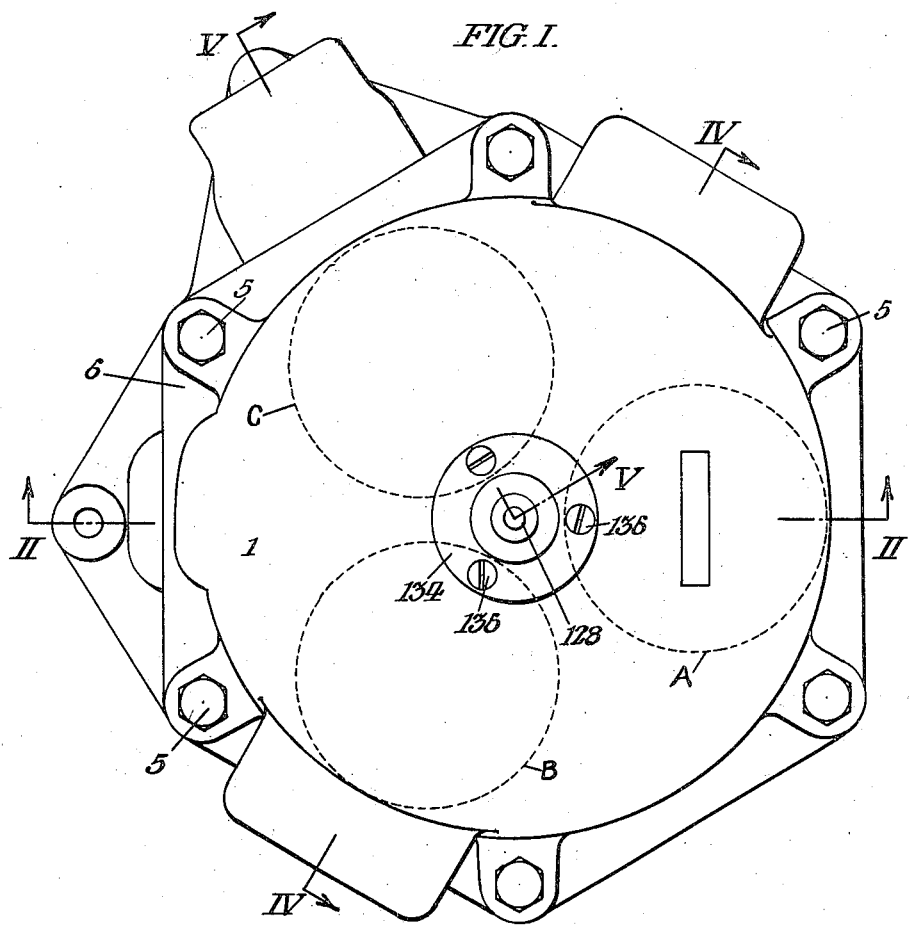
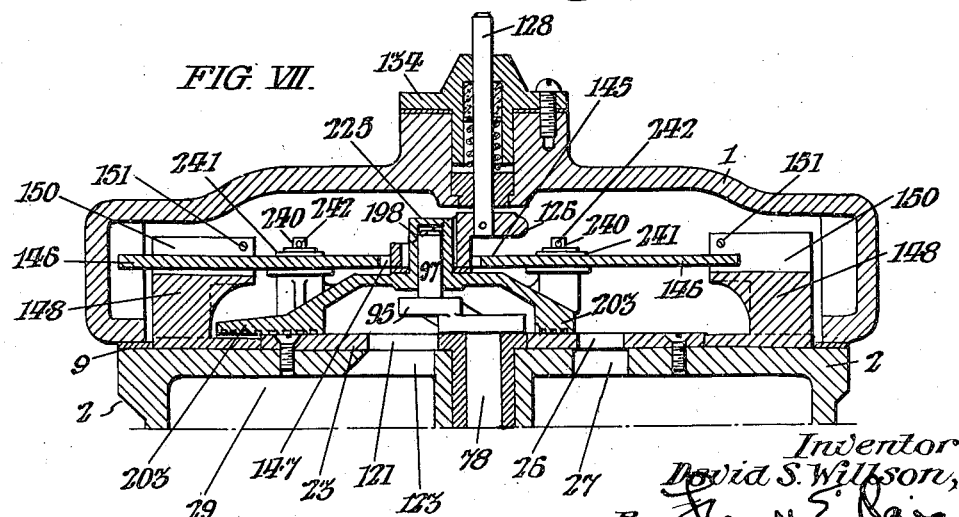
Inventor:
David S. Willson,
By
Attorney.

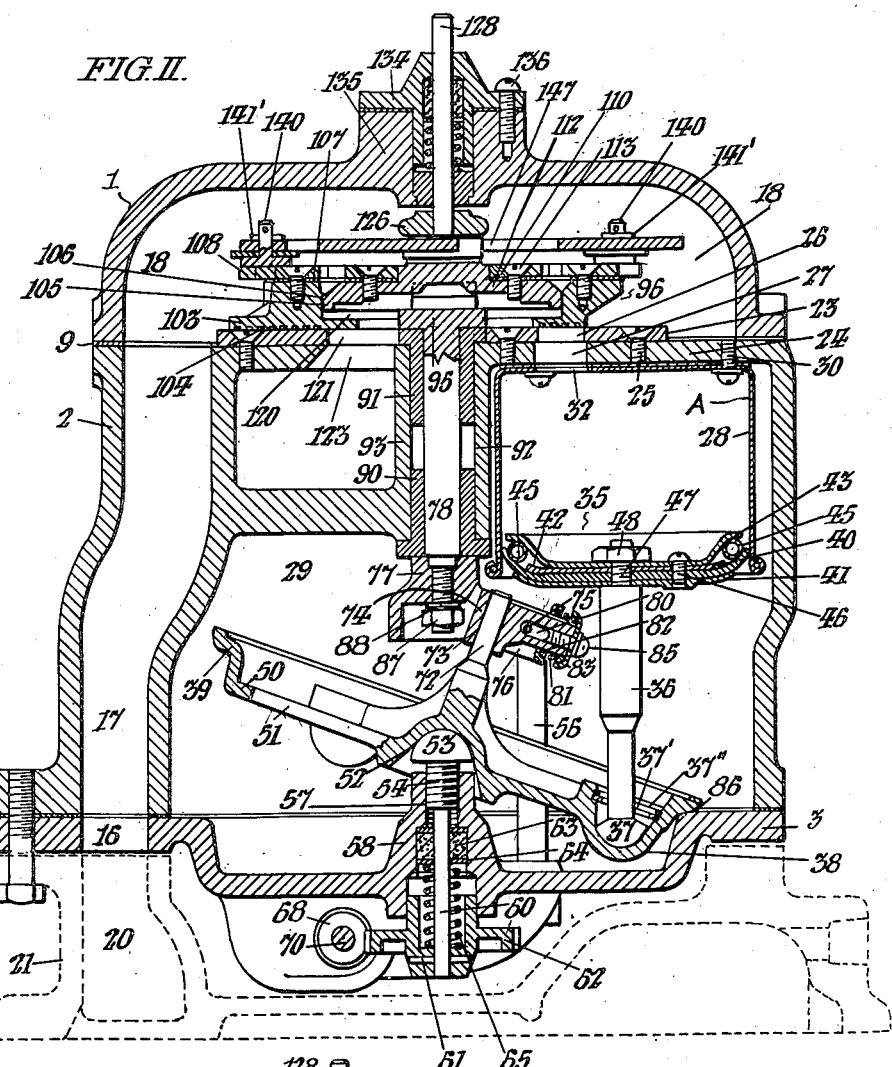
FIG.II.
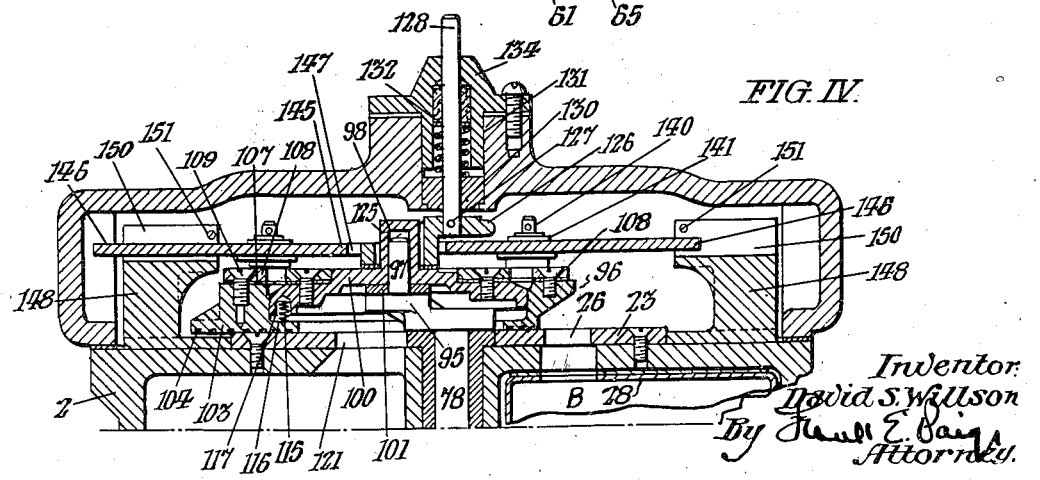
FIG.IV.
Inventor:
David S. Willson

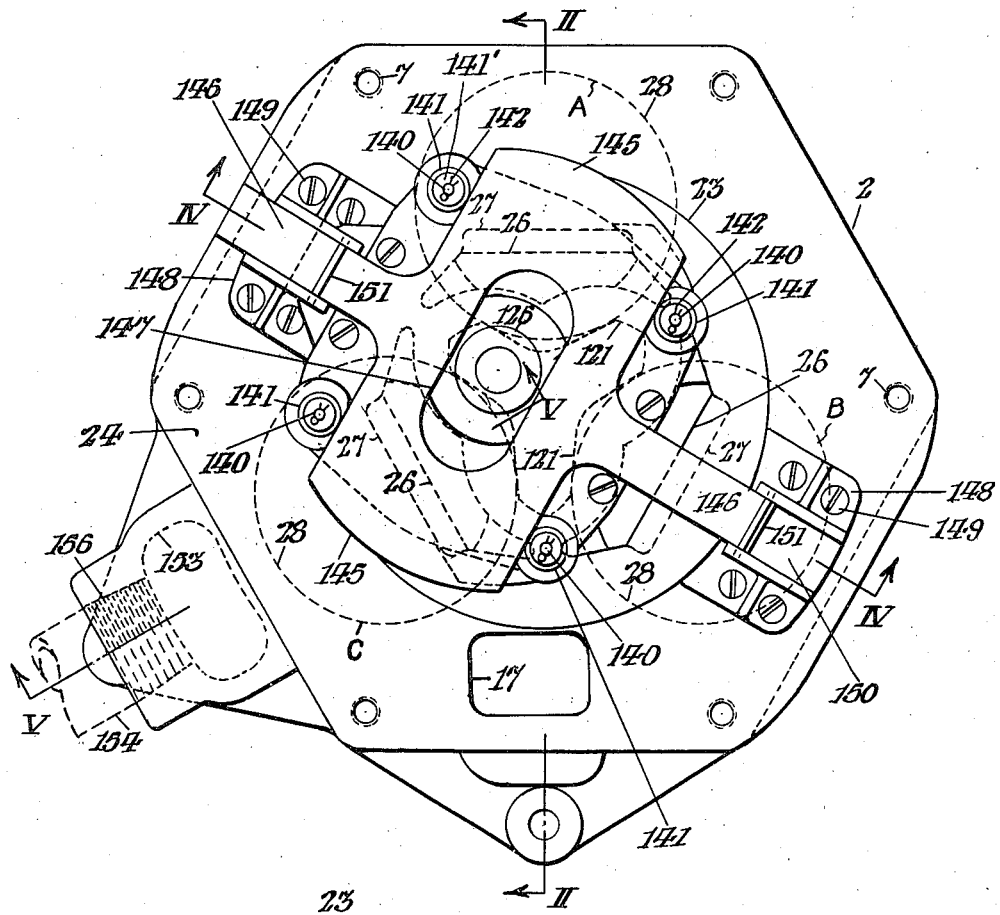
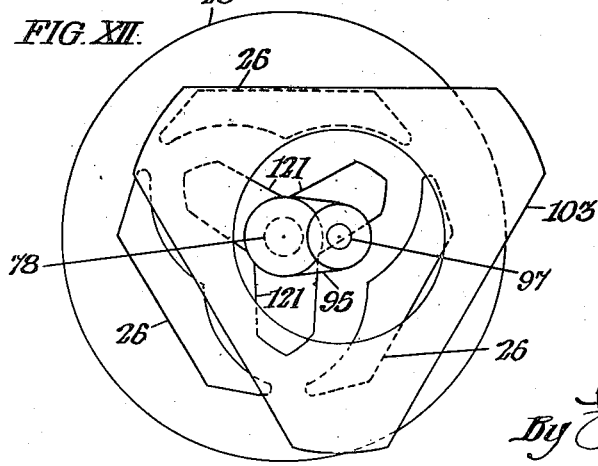

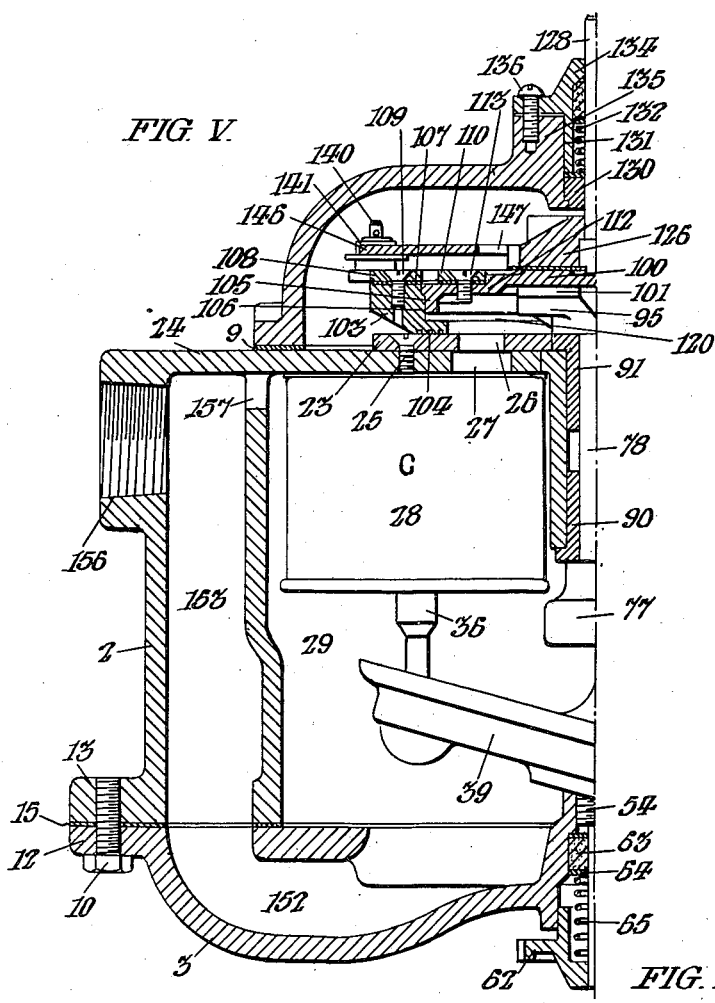

Feb. 15, 1949.  D. S. WILLSON  2,462,044
COMPOUND MOTION DISTRIBUTING VALVE FOR
EXPANSIBLE CHAMBER METERS
Filed Dec. 23, 1944  6 Sheets-Sheet 5
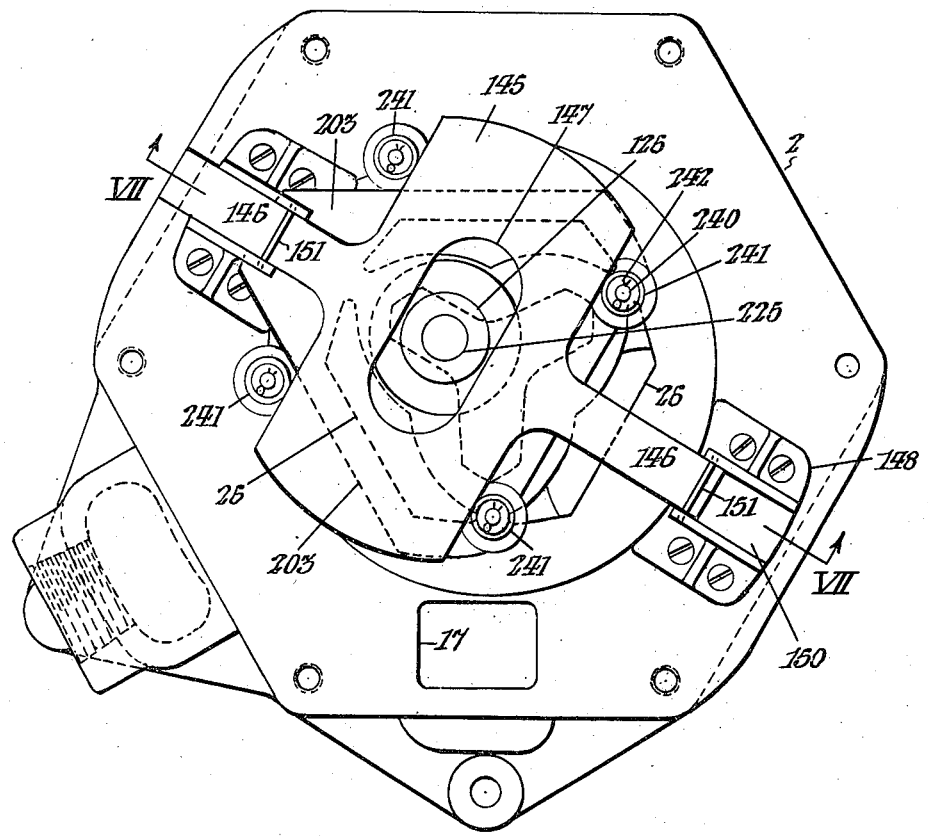
FIG. VI.
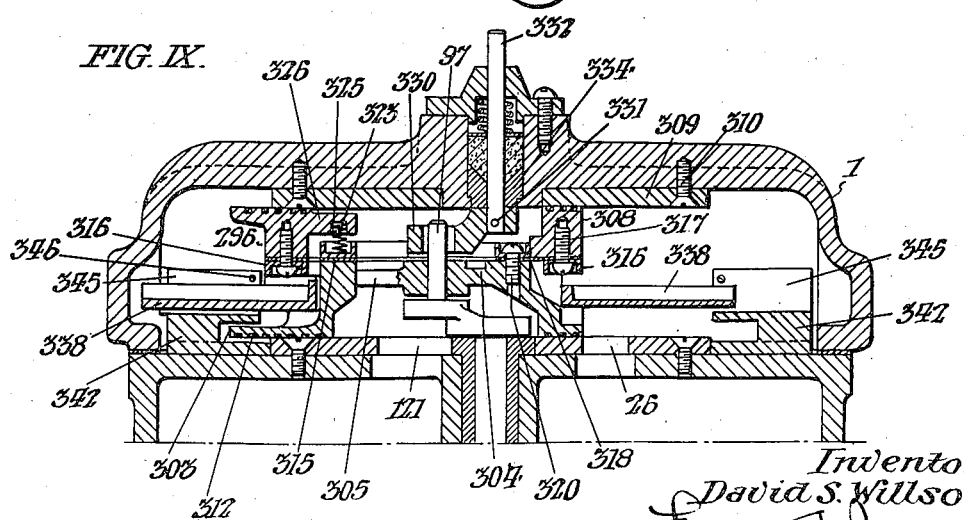
FIG. IX.
Inventor:
David S. Willson,
By
Attorney.

Feb. 15, 1949.                    D. S. WILLSON                    2,462,044
                     COMPOUND MOTION DISTRIBUTING VALVE FOR
                              EXPANSIBLE CHAMBER METERS
Filed Dec. 23, 1944                                     6 Sheets-Sheet 6
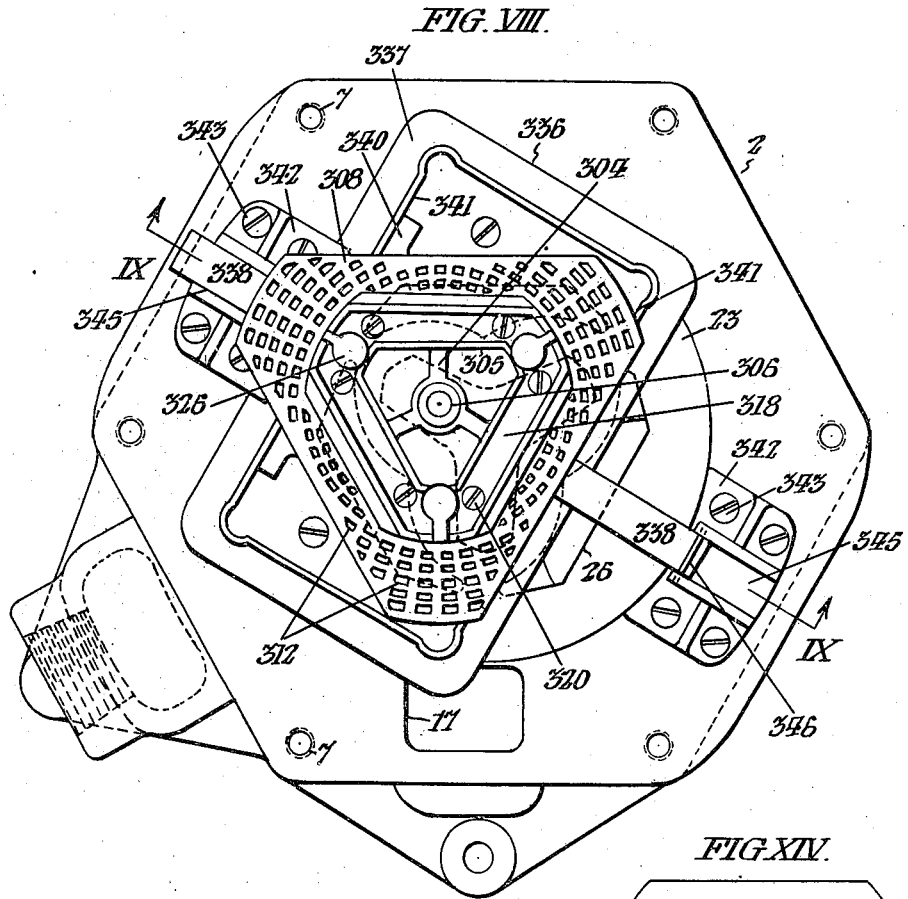
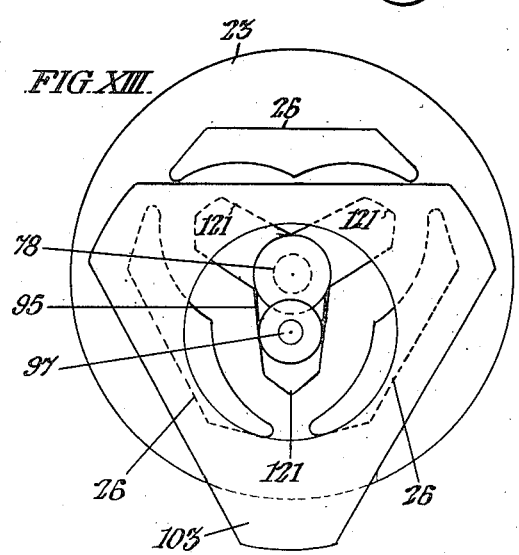
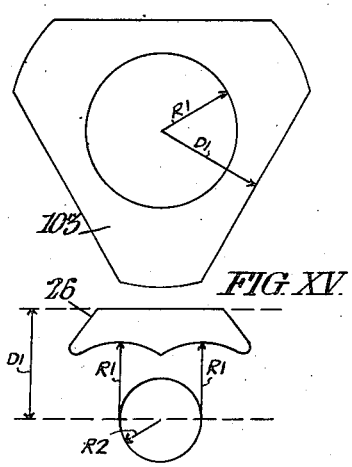
Inventor:
David S. Willson,
By [signature]
Attorney.

Patented Feb. 15, 1949

2,462,044

UNITED STATES PATENT OFFICE 2,462,044

COMPOUND MOTION DISTRIBUTING VALVE FOR EXPANSIBLE CHAMBER METERS

David S. Willson, Muskegon Heights, Mich., assignor to John Wood Manufacturing Company, Inc., Philadelphia, Pa., a corporation of Delaware Application December 23, 1944, Serial No. 569,478

16 Claims. (Cl. 121—131)

My invention relates to improvements in fluid meters of the positive displacement type which are particularly adaptable for use in dispensing apparatus which measures accurately the volume of fluid dispensed. My improved meter is also adaptable for other uses, such as for installation in a pipeline to measure accurately the volume of fluid flowing under pressure through the pipeline, etc.

My invention relates particularly to the improvements in the valve and valve port means embodied in the meter.

One object of my invention is to provide a fluid meter in which the port leading from the inlet chamber to the cylinder will be opened to a large area by the initial opening movement of the meter valve.

Another object of my invention is to provide a fluid meted in which a large area of said port will continue to be open as the meter valve approaches its closure point across said port.

Another object of my invention is to provide a meter which has a greater average valve opening throughout the stroke of the piston on its inlet cycle.

Another object of my invention is to provide a valve port which has a great total length at its inner periphery.

Another object of my invention is to provide a meter valve in which there is a minimum of hydraulic pressure on the seating surfaces of the valve.

My invention includes the various novel features of construction, arrangement, and method of operation hereinafter described.

In said drawings; Fig. I is a top plan view of a meter embodying my invention.

Fig. II is a vertical sectional view taken on the lines II—II in Figs. I and III.

Fig. III is a plan view of the meter body with the top cover removed and with the meter valve shown on its seat, and with the throw of the crank shaft on the line IV—IV.

Fig. IV is a fragmentary vertical sectional view on a plane of section taken on the lines IV—IV in Figs. I and III.

Fig. V is a vertical sectional view taken on the lines V—V in Figs. I and III.

Fig. VI is a plan view, similar to Fig. III, showing a modified form of meter valve on its valve seat.

Fig. VII is a fragmentary vertical sectional view of the valve structure shown in Fig. VI, and taken on the lines VII—VII in Fig. VI.

Fig. VIII is a plan view, similar to Figs. III and VI, and showing another modified form of meter valve in position on its valve seat.

Fig. IX is a fragmentary vertical sectional view of the valve structure shown in Fig. VIII, taken on the lines IX—IX in Fig. VIII.

Figs. X, XI, XII and XIII are schematic porting layouts showing, in plan, different positions of the valve with respect to the valve ports which are opened and closed by the valve, and show the configuration of the valve surface which is in sliding contact with the valve seat. The schematic layouts shown in Figs. X to XIII inclusive are generic to the form of valve shown in Figs. II and IV and the modified forms shown in Figs. VII and IX. Fig. XI shows the valve moved 90° clockwise from the position in which it is shown in Fig. X. Fig. XII shows the valve moved 90° clockwise from the position in which it is shown in Fig. XI. Fig. XIII shows the valve moved 90° clockwise from the position in which it is shown in Fig. XII.

Figs. XIV and XV are schematic views showing the relative radii of the meter valve and the ports controlled by the valve.

Referring to Figs. I to V inclusive of the drawings; the meter is conveniently formed in three parts comprising the top cover 1, main body casing 2 and base portion, or bottom closure 3. Said top cover 1 is conveniently rigidly connected to the body casing 2 by means of a circumferential series of bolts 5 which extend through openings in the flange 6 of the top cover 1 into matching screw threaded holes 7 in the top of the body casing 2. I find it convenient to interpose a gasket 9 between the top cover 1 and body casing 2 in order to maintain said top 1 and body casing 2 in fluid tight relationship. Said bottom closure 3 is conveniently rigidly connected to the body casing 2 by means of a circumferential series of bolts 10 which extend through openings in the flange 12 of the bottom closure 3 into matching screw threaded holes formed in the bottom flange 13 of the body casing 2. I find it convenient to interpose the gasket 15 between the bottom closure 3 and body casing 2 to maintain said bottom closure 3 and body casing 2 in fluid tight relationship.

Said bottom closure 3 is provided with the inlet opening 16 which is in registry with the inlet passageway 17 formed in the body casing 2. Said inlet passageway 17 is in open communication with the inlet chamber 18 formed in said top cover 1. Said meter is adapted to be mounted with the inlet opening 16 in registry with, or connected to, a source of fluid under pressure which is measured as it passes through the meter, For example, as indicated in Fig. II, I have shown my improved meter mounted on top of an air eliminator chamber, indicated in dotted lines, of a gasoline dispensing apparatus, with the inlet opening 16 in registry with the outlet opening 20 in the top cover 21 of the air eliminator.

I find it convenient to form the valve seat 23 as a separate flat plate which is connected to the top wall 24 of the body casing 2 by means of a series of screws 25 which extend through drilled or punched openings in said valve plate 23 into engagement with matching screw threaded holes in said top wall 24. Said valve plate 23 is provided with a series of three port openings 26 therethrough which are in registry with openings 27 formed in the top wall 24 of the body casing 2. The effective port area conveniently is determined by the configuration and area of the accurately formed ports 26 in the valve plate 23. Each port 26 is in open communication with its piston cylinder 28. I find it convenient to form said piston cylinders 28 as pressed, or stamped, inverted steel cups which are rigidly secured to the underside of the top wall 24 of the chamber 29 of the body casing 2 by means of screws 30 which extend through punched or drilled openings in the top walls of the cups 28 into engagement with matching screw threaded holes formed in the top wall 24 of the chamber 29. The top wall of each cylinder cup 28 is provided with an opening 32 which is in registry with the port opening 26 for that piston cylinder.

Although I have found it convenient to illustrate my invention with reference to a 3-piston cylinder type of meter, it is obvious that the number of piston cylinders used is optional, and although I have shown and described the piston cylinders 28 formed as separate cups attached to the top wall 24 of the body casing 2, it is obvious that said cylinders may be formed either as an integral part of the body casing 2, or formed in a cylinder block as part of the body casing, such constructions being old and well known in the art.

As best shown in Fig. II, each of the cylinders 28 is provided with a piston assembly 35 which is mounted in a cylinder 28 for reciprocation in response to the fluid pressure on top of the piston. In Fig. II, for purposes of clarity, I have shown only the cylinder and piston assembly which comes in the line of section. Each piston assembly 35 includes a connecting rod 36 provided at its lowermost end, as viewed in Fig. II, with ball end 37 which is mounted and confined in a socket 38 formed in the wabble plate 39. Each ball end 37 is conveniently retained in its socket 38 by means of a washer 37' and snap ring 37". Although I have shown the sockets 38 formed as an integral part of the wabble plate 39, it is obvious that said sockets may be formed as separate stampings inserted into openings formed in said wabble plate, as is well known in the art. Each piston assembly 35 includes a cup leather 40, piston backing plate 41, intermediate plate 42, piston spring retainer plate 43, and piston expander spring 45. The piston spring retainer plate 43, intermediate plate 42, cup leather 40, piston expander spring 45 and piston backing plate 41 are assembled together by means of a series of screws 46, one of which is shown in Fig. II, which extend through matching openings formed in said piston spring retainer plate 43, intermediate plate 42, cup leather 40 into matching screw threaded holes formed in said piston backing plate 41. Each piston assembly 35 is mounted on the screw threaded reduced portion 47 of the piston rod 36 and maintained in rigid position on the piston rod 36 by means of a nut 48. The piston assembly shown and described is of a well known construction wherein the piston expander spring 45 is adapted to maintain the upturned edge of the cup leather 40 in continuous frictional engagement with the side wall of the cylinder 28.

I find it convenient to form the web 50 of the wabble plate 39 as a spider, including a series of openings 51 in spaced relation to the series of sockets 38 which are formed in enlarged portions in the spider arms of the said wabble plate 39. Said openings 51 are formed in the wabble plate merely to lessen the weight thereof. The wabble plate 39 is provided with the socket 52 and said wabble plate 39 is concentrically mounted in the chamber 29 on the hemispherically shaped ball end 53 of the adjusting screw 54. Rotation of the wabble plate 39 is prevented by the pin 56, rigidly mounted in a boss formed in the bottom closure 3, which extends through an elliptically shaped opening formed in the web 50 of the wabble plate 39. The use of an elliptically shaped opening and pin extending therethrough to permit nutation of the wabble plate, but to prevent rotation thereof, is well known in the art. The adjusting screw 54 is in screw threaded relationship with the screw threaded opening 57 of the boss 58 formed in said bottom closure 3. Said adjusting screw 54 has the reduced stem portion 60 which has rigidly connected therethrough at its lower end, by means of the pin 61, the worm gear 62. The reduced stem portion 60 is provided with the packing 63 and packing ring 64. Said packing 63 and packing ring 64 are retained in position by the spring 65, the upper end of which engages the ring 64 and the lower end of said spring 65 is in engagement with the bottom of the socket formed in the hub of said worm gear 62. Said worm gear 62 is in engagement with the worm 68 which is rigidly mounted on the worm shaft 70. Said worm shaft 70 is provided at its outer end, not shown, with a screw driver slot for conveniently effecting adjusting movement of said worm and worm gear. Calibrating adjustment of the meter may be effected by inserting a screw driver in the slot in the end of the worm shaft 70 to turn the worm 68 to effect either clockwise or counterclockwise movement of the worm gear 62, to raise or lower the round-headed adjusting screw 54, and wabble plate 39 in engagement therewith, to thus shorten or lengthen the stroke of the piston assemblies 35 in their respective cylinders 28.

As best shown in Fig. II, the wabble plate 39 is provided with the drive stem shaft 72 which is journalled in the drilled opening 73 formed in the driving block assembly 74 of the crank arm driving block assembly. Said driving block 74 is mounted with freedom of pivotal movement on the crank arm pin 75, the opposite ends of which are held in the bifurcated crank arms 76 (only one of which is shown in Fig. II) formed on the crank 77 rigidly connected to the lower end of the crank shaft 78. Said pin 75 extends through an elongated opening 80 formed in said driving block 74, and, accordingly, said driving block 74 is thus mounted with freedom of both pivotal and reciprocatory movement in its sliding engagement within the bifurcated crank arms 76 of the crank 77 connected to the crank shaft 78. Reciprocatory movement of the driving block 74 is limited by the pin 75 coming into engagement with either end of the elongated opening 80 in the driving block 74. The driving block 74 is provided with the spring 81 held between the inner cup washer 82, in engagement with the ends of the bifurcated crank arms 76, and the outer cup washer 83 which is rigidly mounted on the right hand end of the driving block 74 by means of the screw 85. Such driving block assembly places a loading on the wabble plate stem shaft 72 substantially at right angles to the axis of said stem shaft 72, with the result that all of the forces of the spring 81 act to hold the wobble plate 39 on the wabble plate track 86 formed on the upper side of the bottom closure 3, as viewed in Fig. II. The crank arm and driving block assembly herein described is described and claimed in my copending application Serial No. 601,180 filed June 23, 1945, now Patent No. 2,451,455.

The crank arm 77 is rigidly connected to the screw threaded reduced lower end portion of the crank shaft 78 by means of the nut 87 and lock washer 88. Said crank arm 78 is journalled in thrust bearings 90 and 91 which are press fitted in the opening 92 formed in the bearing 93 which is formed conveniently as an integral part of the main body casing 2. As shown in Fig. IV, said crank shaft 78 is provided at its upper end, in integral relation therewith, with the crank arm 95 and crank pin 97. The crank shaft 78 rotates in a clockwise direction, as viewed in Figs. I and III, and it is to be noted that the crank arm 77, at the lower end of the crank shaft 78, is fastened to said crank shaft 78 at substantially 90° clockwise from the crank pin 97 which drives the meter valve, indicated generally at 96.

As best shown in Fig. IV, the crank pin 97 is journalled in the bearing 98 formed in the imperforate inner section 100 of the valve 96. The friction thrust washer 101 is mounted on the pin 97 and interposed between the crank arm 95 and the bearing surface of the inner section 100.

As best shown in Figs. II to V inclusive, the valve 96 is comprised of the solid outer valve portion 103 and the imperforate inner section 100. The face of said valve section 103, which is in engagement with the valve seat 23 and opens and closes the port openings 26, conveniently is provided with a reticulated series of rectangular indentations 104 which decreases the surface area of the valve section 103 in sliding contact with the valve seat 23.

The principal feature of my invention lies in the configuration of the face of the valve section 103 and the configuration of the valve port openings 26. As best shown in Figs. X to XIV inclusive, said valve section 103 is of essentially triangular configuration outside and is circular inside. As best shown in Figs. X to XIII inclusive and Fig. XV, the outside of each valve port opening 26 is formed as a straight line in a plane parallel, or substantially so, to that straight line side of said valve section 103 which is in sliding contact with that port to open and close it. In Figs. XIV and XV, I have indicated schematically the theoretical method of describing, or generating, the valve port openings 26, with only one port shown for convenience. Referring to Fig. XIV, R1 is the inner radius of the valve section 103, and D1 is the distance from the center to the outer side. Radius R1 is used to generate the inner sides of the valve ports 26. Such inner radius is generated from two points, as illustrated in Fig. XV, on the circle of the axis of the crank pin 97 of the crank shaft 78, which circle has a radius of R2. The outside of the valve port 26 is a straight line which is parallel to, at a distance equal to D1, a line passing through the axes of the radii R1. However, in actual practice the meter valve should have a slight seal on a port when the valve reaches a position in its rotation to close that port. Accordingly, in actual commercial manufacture, the radius R1 of the valve section 103 is made slightly less than the radius R1 of the port 26 by approximately 0.010 inch; and the dimension D1 of the valve section 103 is made greater than the dimension D1 of the port 26 by a corresponding amount. This is best indicated in the schematic views, Figs. X and XII, in which a port 26 is shown completely closed by the valve section 103.

Said inner section 100 of the meter valve 96 is circular in cross section and is provided at its bottom edge, as viewed in Figs. II and IV, with the flange 105 which is slidably fitted in telescopic relation in the annular recess 106 formed in said outer valve section 103. Said outer valve section 103 and inner section 100 are connected by the imperforate diphragm 107, which may be formed, conveniently, from the well known flexible motor fuel diaphragm cloth such as is manufactured and sold by A. C. Spark Plug Company. Said diaphragm 107 is maintained at its outer periphery in fluid tight relationship on the outer valve section 103 by means of the clamping ring 108 which is rigidly clamped to the top of said valve section 103 by means of a circular series of screws 109 which extend through matching openings in said clamping ring 108 and diaphragm 107 into matching screw threaded holes formed in the top of said outer valve section 103. Said diaphragm 107 is maintained at its inner periphery in fluid tight relationship on the inner section 100 by means of the clamping ring 110 which is rigidly clamped to the annular flange 112, formed at the top of said inner valve section 100, by means of a circular series of screws 113 which extend through matching openings in said clamping ring 110 and the inner periphery of said diaphragm 107 into matching screw threaded holes formed in said annular flange 112 of said inner valve section 100.

As best shown in Fig. IV, the outer valve section 103 and inner section 100 are maintained in vertical spaced relation by the thrust washer 101 and by a series of springs 115 positioned between said valve section 103 and said inner section 100. Although in Fig. IV, I have shown only the spring 115 which comes in the plane of section, I find it convenient to utilize three such springs 115 positioned 120° apart. The lower ends of said springs 115 bear upon the annular shoulder 116 formed in the valve section 103 and the upper ends of said springs 115 are engaged in sockets 117 formed in the annular flange 105 of the inner section 100.

The chamber 120, formed of the annular recess in the valve section 100 and the circular opening of the outer valve section 103, is in continuous open communication with the chamber 29 through the outlet ports 121 formed in the valve plate 23. Said outlet port openings 121 in the valve plate 23 are in registry with openings 123 formed in the top wall 24 of the body casing 2. Each outlet port 121 is in open communication with the chamber 29 of the body casing 2. It is noted that in Fig. II one arm of a spider supporting the lower end of the bearing 93 appears in the plane of section. However, the spider arms are of such dimensions as to not prevent open communication between the outlet ports 121 and the chamber 29 of the body casing 2.

As best shown in Fig. IV, the projection 125, of the inner valve section 100, in which the bearing 98 is formed for the pin 97, forms the driving pin for the drive shaft arm 126 which is rigidly fastened by means of the tapered pin 127 to the lower end of the drive shaft 128. Said drive shaft 128 is adapted to be connected at its upper end, by any convenient means, to a recording mechanism which registers the volume of fluid passed by the meter. Said drive shaft 128 is journalled in the bearing 130 in the cylindrical opening 131 formed in the top cover 1. I find it convenient to provide said drive shaft 128 with the spring loaded stuffing box 132, which may be of any of the well known constructions. The upper end of said shaft 128 is journalled in the closure cap 134 which is rigidly connected to the boss 135, formed at the top of the top cover 1, by means of a series of screws 136.

Said valve is provided with a parallel motion mechanism, or "Scotch yoke," to maintain parallel at all times each outer straight side of the valve section 103 with the outer straight side of the respective valve port opening 26 controlled. As best shown in Figs. II, III, and IV, the outer clamping ring 108 is provided at each of its four corners with a roller pin 140 rigidly mounted in said clamping ring 108. Each pin 140 has mounted thereon with freedom of turning movement a valve yoke roller 141, and said rollers 141 are retained on said pins 140 by means of washers 141' and cotter pins 142.

The valve yoke 145 is formed as a flat plate and is provided with oppositely extending arms 146 and has a central opening 147 within the body portion. As best shown in Figs. III and IV, the drive shaft arm 126 is engaged with the projection 125 of the valve assembly. Said drive shaft arm 126 is positioned within the central opening 147 with clearance between said drive shaft arm 126 and the periphery of the central opening 147. The movement of said valve 96 is restricted to a predetermined path of travel, as hereinafter described, by the valve yoke 145 co-acting with the rollers 141 and because the path of movement of the arms 146 is limited by the guide brackets 148 in which said arms 146 are mounted.

The oppositely extending arms 146 of the valve yoke 145 are respectively mounted in the yoke guide brackets 148 which are rigidly fastened, by means of a series of screws 149, to the top wall 24 of the body casing 2. As best shown in Figs. III and IV, the brackets 148 are provided with a U-shaped guide channel 150 in which an arm 146 is mounted with freedom of reciprocal movement. Said arms 146 are conveniently retained within said U-shaped guide channels 150 by means of a pin 151 which extends through the opposite side walls of the U-shaped channel 150 and overlies the arm 146, as best shown in Fig. IV. As best shown in Fig. III, a pair of said rollers 141 engages each of the parallel sides of the body portion of the yoke 145. In view of the fact that the arms 146 of the yoke 145 are held in sliding engagement in the channels 150 of the fixed brackets 148, movement of the yoke 145 is limited to a horizontal movement on an axis coinciding with the lines IV—IV in Fig. III. As movement of said yoke 145 is thus limited, movement of the valve 96 (effected by the crank pin 97 journalled in the bearing 98 of the projection 125) is limited to a path of travel in which each outer straight side of the valve 96 is at all times parallel to the outer straight side of its respective controlled valve port opening 26.

As best shown in Fig. V, said chamber 29 is in open communication with the outlet passageway 152 formed in the bottom closure 3. Said outlet passageway 152 is in open communication with the outlet passageway 153 formed in the body casing 2, and the outlet pipe 154 is connected to the screw threaded opening 156 formed in the top of the outlet passageway 153. The outlet passageway 153 is in restricted open communication with the chamber 29 through the communicating passageway 157 formed in the top wall of the chamber 29. Communication between the top of said outlet passageway 153 and the chamber 29 is desirable to carry off any air with the returned liquid, so as to displace quickly all of the air in the meter body when it is placed into service. If it were not for such communication between the outlet passageway 153 and the chamber 29, a certain amount of air would be entrapped between the cylinder cups 28 and the body casing 2 for a considerable period of time before such air would be absorbed by the liquid. Entrapment of air would be objectionable because of the alternate compression and expansion of such air during operation of the meter, depending upon the time elapsing between the closing of the dispensing nozzle valve in consecutive deliveries, and such alternate compression and reexpansion of air would result in variations in the recorded delivery of the meter.

In Figs. VI and VII I have shown a form of meter valve 203 which is a modification of the valve generally indicated by the reference mark 96 in Figs. I to V inclusive. Said modified form of valve 203 is embodied in a meter of the same construction as heretofore described. Said valve 203 is of one piece imperforate construction and is of essentially triangular configuration outside and is circular inside, like said valve 96 heretofore described. As best shown in Fig. VII, the projection 225, which is formed as an integral part of said valve 203, is provided with the bearing 198 for the crank pin 97. Said projection 225 forms the driving pin for the drive shaft arm 126.

Said valve 203 is provided with four upwardly extending bosses, in rectangular arrangement, in each of which is rigidly mounted a roller pin 240. A valve yoke roller 241 is mounted on each pin 240 with freedom of turning movement, and said rollers 241 are retained on said pins 240 by means of cotter pins 242. A pair of rollers 241 engages each of the parallel sides of the body portion of the yoke in the manner heretofore described.

In the form of valve shown in Figs. VI and VII, the drive shaft arm 126 is engaged within the central opening in the yoke, in the same manner as heretofore described, to restrict movement of the valve 203 to a predetermined path of travel, like the valve 96.

In Figs. VIII and IX, I have shown another modified form of meter valve, generally indicated by the reference mark 296. Said modified form of valve 296 includes the lower valve section 303 which is of essentially triangular configuration outside and is circular inside, like said valve section 103 heretofore described, and the face of said valve section 303 is in sliding engagement with the valve seat 23 to open and close the port openings 26. Conveniently, the face of said valve section 303 is provided with a reticulated series of rectangular indentations which decreases the surface area of the valve section 303 in sliding contact with the valve seat 23. The web 304, forming the top of the lower valve section 303, is provided with a series of three openings 305 therethrough to permit fluid to pass freely from the underside of said web 304 to the upper section of the valve 296. Said web 304 is provided with the drilled opening 306 which forms the bearing for the crank pin 97 by which movement of the valve is effected.

The upper section 308 of said valve is likewise of essentially triangular configuration outside and is circular inside, like the lower valve section 303. The upper valve plate 309, located in the inlet chamber 18, is rigidly connected to the underside of the top cover 1 by means of a series of screws 310, two of which are shown in Fig. IX, which extend through openings in said upper valve plate 309 into matching screw threaded holes formed in the underside of the top cover 1. The face of the upper section 308 is in sliding contact with the plate 309, and, conveniently, said face is provided, like the faces of the valve sections 103, 203 and 303, with a reticulated series of indentations 312 to decrease the surface area of said face in contact with said plate 309.

Said lower valve section 303 and upper section 308 are maintained in sliding telescopic spaced relationship and are connected by the imperforate diaphragm 315, which may be formed, conveniently, from the well known flexible motor fuel diaphragm cloth heretofore referred to. Said diaphragm 315 is maintained at its outer periphery in fluid tight relationship on the underside of said upper section 308 by means of a clamping ring 316 which is rigidly clamped to the underside of said valve section 308 by means of a series of screws 317 which extend through matching openings in said clamping ring 316 and diaphragm 315 into matching screw threaded holes formed in said upper section 308. Said diaphragm 315 is maintained at its inner periphery in fluid tight relationship on the upper surface of the lower valve section 303 by means of the clamping ring 318 which is rigidly clamped to the top of the valve section 303 by means of a series of screws 320 which extend through matching openings in said clamping ring 318 and the inner periphery of said diaphragm 315 into matching screw threaded holes formed in the top of said valve section 303.

As best shown in Fig. IX, the valve section 303 and upper section 308 are maintained in spaced relation by a series of springs 323 positioned between said upper section 308 and the clamping ring 318 rigidly connected to the top of the valve section 303. Although in Fig. IX, I have shown only the spring 323 which comes in the plane of section, I find it convenient to utilize three such springs 323 positioned 120° apart. The upper ends of said springs 323 are engaged in sockets 325 formed in the inner lugs 326 of the upper valve section 308. The lower ends of said springs 323 bear upon the upper surface of the clamping ring 318.

As best shown in Fig. IX, the pin 97 forms the driving means for the drive shaft arm 330, like the drive shaft arm 126, which is rigidly fastened by means of the pin 331 to the lower end of the drive shaft 332. Said drive shaft 332 is adapted to be connected at its upper end, by any convenient means, to a recording mechanism which registers the volume of fluid passed by the meter. Said drive shaft 332 is journalled in the bearing 334 in the cylindrical opening formed in the top cover 1. Said drive shaft 332 is provided with a springloaded stuffing box substantially similar to the stuffing box heretofore described for the driving shaft 128 shown in Fig. IV.

Said valve, generally indicated at 296, is provided with a parallel motion mechanism, or "Scotch yoke," to maintain parallel at all times each outer straight side of the valve 303 with the outer straight side of the respective valve port opening 26 controlled. Of course, the path of movement of the upper valve section 308, in sliding contact with the upper plate 309, corresponds to the path of movement of the valve section 303.

As best shown in Fig. III, the valve yoke 336 is comprised of a central hollow rectangular frame 337 which is provided with oppositely extending arms 338. The valve section 303 is provided with four upstanding lugs, or projections, 340 which are in sliding engagement with the inner parallel side surfaces 341 of the rectangular hollow frame 337. Only one pair of lugs 340 is shown in Fig. VIII. A similar pair of lugs 340 is in engagement with the right-hand inner side surface 341 of the rectangular hollow frame 337.

The oppositely extending arms 338 of the valve yoke 336 are respectively mounted in the yoke guide brackets 342, similar to the guide brackets 148, which are rigidly fastened by means of a series of screws 343 to the top wall of the body casing. The brackets 342 are provided with a U-shaped guide channel 345 in which an arm 338 is mounted with freedom of reciprocal movement. Said arms 338 are conveniently retained within said U-shaped guide channels 345 by means of a pin 346 which extends through the opposite side walls of the U-shaped channel 345 and overlies the arm 338, as best shown in Fig. IX.

The lugs 340, formed on the valve 303 and in sliding engagement with the parallel sides 341 of the yoke 336, function in the same manner as the previously described rollers 141 which engage each of the parallel sides of the body portion of the yoke 145, shown and described with reference to Fig. III. In view of the fact that the arms 338 of the yoke 336 are held in sliding engagement in the channels 345 of the brackets 342, movement of the yoke 336 is limited to a reciprocatory movement on an axis coinciding with the lines IX—IX in Fig. VIII. A movement of said yoke 337 is thus limited, movement of the valve 296 (effected by the crank pin 97 journalled in the bearing 306) is limited to a path of travel in which each outer straight side of the valve section 303 is at all times parallel to the outer straight side of its respective valve port opening 26. As best shown in Fig. IX, it is to be noted that the pin 97 is disposed in an enlarged bearing opening formed in the drive shaft arm 330, and thus permits the valve 303 to be moved in a path of travel heretofore described.

*Operation*

Although the following is a description of the operation of the specific form of my invention shown in Figs. I to V inclusive, the modified forms of my invention shown in Figs. VII and IX operate in the same general manner. For purposes of clarity in the following description of the operation of the form of my invention shown in Figs. I to V inclusive, I have identified each of the three cylinders 28 with the identifying symbols "A," "B," "C" as indicated in Figs. I, II, III, IV and V. For simplification purposes, the piston assembly is not shown in Fig. IV, nor are the cylinders and piston assemblies shown in Figs. VII and IX. It should be noted that in Fig. II, the crank arm 95 and crank pin 97 are directly away from the observer, and that the valve 103 completely overlaps the port 26 leading to the cylinder 28 identified by "A" in Fig. II, and also identified as "A" in Figs. I and III.

Assuming the meter to be completely filled with liquid as installed in a conventional type of gasoline pump, such as is disclosed in Letters Patent of the United States No. 2,351,331, granted June 13, 1944, to M. J. Goldberg, the meter inlet opening 16 is connected to the outlet opening 20 in the top cover 21 of an air eliminator. With liquid being dispensed through the meter, the liquid under pressure flows up the inlet passageway 17 to the inlet chamber 18 formed in the top cover 1. With the meter valve 96 in the position shown in Fig. II, and as schematically indicated in Fig. X, said valve 96 has completely covered and closed off the port 26 leading to the cylinder 28 identified by "A." The port 26 leading to the cylinder 28 identified as "B" would be in open communication to receive liquid under pressure from the chamber 18. The port 26 leading to the cylinder 28 identified by "C" is within the chamber 120 and, hence, fluid within the cylinder "C" is in the process of being discharged from said cylinder "C" upwardly through the port opening 26 from said cylinder "C" and through the outlet ports 121 to the outlet chamber 29 of the body casing 2. The liquid under pressure from the chamber 18 entering through the port 26 to cylinder "B" would force the piston assembly 35 in said cylinder "B" downwardly. Such downward movement would move the wabble plate 39, thus causing the crank shaft 78 to revolve clockwise, as viewed in Fig. X. Clockwise movement of the crank shaft 78 moves the valve 96 clockwise, and if such movement were limited to 90° of one rotation, the valve 96 would be moved from the position shown schematically in Fig. X to the position shown schematically in Fig. XI. With the valve moved to the position shown in Fig. XI, the port 26 for cylinder "A" would be in communication with the outlet ports 121, and the piston assembly in cylinder "A" would deliver liquid on its upward stroke to the chamber 120 and thence through the outlet ports 121. With the valve 96 in the position shown schematically in Fig. XI, the ports 26 leading to cylinders "B" and "C" are partially open to chamber 18.

Assuming that the operation of the meter has moved the valve 96 further 90° clockwise and from the position shown in Fig. XI to the position shown in Fig. XII, the port 26 leading to cylinder "A" is completely closed and the port 26 of cylinder "B" is in communication with the chamber 120 and outlet ports 121. In this position the port 26 of the cylinder "C" has been opened in wider communication with the chamber 18. Assuming that the meter valve 103 has been rotated 90° further in a clockwise direction, or from the position shown in Fig. XII to the position shown in Fig. XIII, the port 26 leading to and from the cylinder "A" is open to the chamber 18. The respective ports 26 of cylinders "B" and "C" are closed to chamber 18, but are in open communication with chamber 120 to discharge liquid through the ports 121 into the outlet chamber 29 formed in the meter body 2.

As the meter operates, liquid is forced downwardly in the chamber 29 and out through the passageway 152, formed in the bottom closure 3, and thence through the outlet passageway 153 to the outlet pipe 154 which, in a liquid dispensing apparatus, is connected to the valve-controlled dispensing nozzle of such apparatus.

It is to be noted that since the meter shown and described herein has three pistons, and because each piston is driven for 180° of rotation of the crank shaft, the meter construction shown could not stop on a so-called dead center, as would be possible in a two-cylinder single acting structure.

Since the valve 96 is provided with parallel motion mechanism, including the yoke 145 etc. heretofore described, each outer straight side of the valve 96 is maintained parallel at all times with the outer straight side of the respective valve port opening 26 controlled, as may be seen clearly from the schematic views X to XIII inclusive. Thus, the port openings 26 will be opened the entire length of the outer straight side thereof and to a large area even by the initial opening movement of the valve 96. Correspondingly, a large area of the port openings 26 will continue to be open as the meter valve 96 approaches its closure point across a port 26. This results in a greater average valve opening throughout the stroke of the piston 35 on its inlet cycle.

As may be noted from the schematic views X to XIV inclusive and Fig. XV, with the inner periphery of the valve 96 being circular in configuration and with the inner periphery of the valve port 26 being formed as segments of circles, the valve port 26 has a great total length at its inner periphery and fluid may be discharged through a large area of said valve port 26 even as the closure point is approached.

It is obvious that the form of meter valve, indicated generally at 96, shown in Fig. IV is pressed downwardly, or toward its seat, by the inlet liquid pressure which is greater during delivery conditions than the outlet liquid pressure. It will be observed that some portion of the pressure load is effective on the inner section 100 of said valve and is transmitted to the thrust washer 101, crankshaft 78, and crankshaft bearings 91 and 90. With part of the total downward fluid pressure distributed over the inner section 100, the remainder of the pressure load is distributed on the outer section 103 which is in contact with the valve seat 23. By proportioning the size of the parts to give a larger mean effective area of the diaphragm 107 which is exposed on both sides to the inlet and outlet liquid pressures respectively, a larger proportion of the total downward pressure load is carried by the inner section 100 and said bearings. If too large a mean effective area is used on the diaphragm 107, the downward loading would be insufficient to hold the outer valve section 103 in proper contact with its seat at all times and at all points during its travel. It is desirable that the design be so proportioned as to result in just enough of the downward force being imposed on the outer valve section 103 to always keep it seated and to cause the rest of the pressure load to be carried by the crankshaft 78 as above described. This proportioning of areas to obtain the desired distribution, or "balance," of loading is herein defined as "hydraulic balancing." Thus it will be seen that the meter valve indicated generally at 96 is substantially "hydraulically balanced" to properly distribute the pressure loads as desired on the inner section 100 and the outer section 103 respectively.

It will be noted that in the form of valve shown in Fig. VII, the downward pressure load is wholly imposed on the valve 203 and thence to its seat 23, and therefore no portion of this downward pressure load is carried by the crankshaft 78 or its bearings.

It is to be also noted that in the form of my invention shown in Figs. VIII and IX wherein the valve has two opposite surfaces in contact with respective valve seats, the forces (as represented by the excess of the inlet pressure over the outlet pressure) acting on the valve sections, to cause them to be pressed on to their respective seats, are modified to the desired value by proportioning the mean effective area of the diaphragm which permits free running of the valve without loading the crankshaft vertically. Accordingly, my improved meter operates with a minimum of energy consumption, which results in a minimum of pressure drop through the meter and a maximum accuracy of the meter.

It is obvious that various modifications may be made in my invention without departing from the essential features thereof as defined in the appended claims, and, therefore, I do not desire to limit myself to the precise details of construction, arrangement, or method of operation herein set forth.

I claim:

1. In a fluid meter, the combination with displacement mechanism; of means affording a plurality of ports adapted to permit flow to and from said mechanism; each port having a straight outside wall and a curvilinear inner wall; a valve having a plurality of straight sides at its outer edge and having a curved inner edge; means operatively associated with said displacement mechanism for operating said valve; and means for maintaining each outer straight side of said valve in parallelism with the outside straight wall of the respective port controlled.

2. A structure as in claim 1; wherein the valve member is comprised of a lower section and an upper section in telescopic spaced relation, each section having a plurality of straight sides at its outer edge and each section having a circular inner edge; and wherein said lower section is moved across said ports in sliding engagement therewith to open and close said ports and said upper section is in sliding engagement with an imperforate surface.

3. A structure as in claim 1; wherein the valve member is comprised of a lower section and an upper section in telescopic spaced relation, each section having a plurality of straight sides at its outer edge and each section having a circular inner edge; expansion spring means between said lower section and said upper section; and wherein said lower section is moved across said ports in sliding engagement therewith to open and close said ports and said upper section is maintained by spring means in sliding engagement with an imperforate surface.

4. A structure as in claim 1; wherein the valve member is comprised of a lower section and an upper section in telescopic spaced relation, each section having a plurality of straight sides at its outer edge and each section having a circular inner edge; and wherein said lower section is moved across said ports in sliding engagement therewith to open and close said ports and said upper section is in sliding engagement with an imperforate surface parallel to the upper surface of said ports.

5. A structure as in claim 1; wherein the number of the straight sides of the valve member is the same as the number of ports controlled by said valve member.

6. A structure as in claim 1; wherein the valve member is comprised of a lower section and an upper section in telescopic relation, said lower section having said plurality of straight sides at its outer edge and said curved inner edge; and wherein said lower section is moved across said ports in sliding engagement therewith to open and close said ports and said upper section is in sliding engagement with an imperforate surface.

7. A structure as in claim 1; wherein the valve member is comprised of a lower section and an upper section in telescopic spaced relation, said lower section having said plurality of straight sides at its outer edge and having said curved inner edge; expansion spring means between said lower section and said upper section; and wherein said lower section is moved across said ports in sliding engagement therewith to open and close said ports and said upper section is maintained by spring means in sliding engagement with an imperforate surface.

8. A structure as in claim 1; wherein the valve member is comprised of a lower section and an upper section in telescopic spaced relation, said lower section having said plurality of straight sides at its outer edge and having said curved inner edge; and wherein said lower section is moved across said ports in sliding engagement therewith to open and close said ports and said upper section is in sliding engagement with an imperforate surface parallel to the upper surface of said ports.

9. A structure as in claim 1; wherein the valve member is comprised of a lower section and an upper section in spaced relation, said lower section having said plurality of straight sides at its outer edge and having said curved inner edge; and wherein said lower section is moved across said ports in sliding engagement therewith to open and close said ports, and said upper section is in sliding engagement with an imperforate surface.

10. In a fluid meter, the combination with displacement mechanism; of means affording a plurality of ports adapted to permit flow to and from said mechanism, each port having a straight outside wall and a curvilinear inner wall; a valve having a plurality of straight sides at its outer edge and having a curved inner edge; means operatively associated with said displacement mechanism for operating said valve; and means for maintaining each outer straight side of said valve in parallelism at all times with the outside straight wall of the respective port controlled.

11. In a fluid meter, the combination with displacement mechanism; of means affording a plurality of ports adapted to permit flow to and from said mechanism, each port having a straight outside wall and a curvilinear inner wall; a valve having a plurality of straight sides at its outer edge and having a circular inner edge; means operatively associated with said displacement mechanism for operating said valve; and means for maintaining each outer straight side of said valve in parallelism with the outside straight wall of the respective port controlled.

12. In a fluid meter, the combination with displacement mechanism; of means affording a plurality of ports adapted to permit flow to and from said mechanism, each port having a straight outside wall and a curvilinear inner wall; a valve having a plurality of straight sides at its outer edge and having a curved inner edge; means operatively associated with said displacement mechanism for operating said valve; and a parallel motion mechanism for maintaining each outer straight side of said valve in parallelism with the outside straight wall of the respective port controlled.

13. In a fluid meter, the combination with displacement mechanism; of means affording a plurality of ports adapted to permit flow to and from said mechanism, each port having a straight outside wall and a curvilinear inner wall; an imperforate integral valve having a plurality of straight sides at its outer edge and having a curved inner edge; means operatively associated with said displacement mechanism for operating said valve; and means for maintaining each outer straight side of said valve in parallelism with the outside straight wall of the respective port controlled.

14. In a fluid meter, the combination with displacement mechanism; of means affording a plurality of ports adapted to permit flow to and from said mechanism, each port having a straight wall edge and a curvilinear wall edge; a valve having a plurality of straight edges to correspond with and control the straight edges of said ports and said valve having curved edges to correspond with and control the curvilinear wall edges of said ports; means operatively associated with said displacement mechanism for operating said valve; and means for maintaining each straight edge of said valve in parallelism with the straight wall edge of the respective port controlled.

15. In a fluid meter, the combination with displacement mechanism; of means affording a plurality of ports adapted to permit flow to and from said mechanism, each port having a straight outside wall and a curvilinear inner wall; a valve having a plurality of straight sides at its outer edge and having a circular inner edge; means operatively associated with said displacement mechanism for operating said valve; and means for maintaining each outer straight side of said valve in parallelism with the outside straight wall of the respective port controlled; wherein the curvilinear inner wall of each port is formed as intersecting segments of a circle having a radius equal to the radius of the circular inner edge of said valve.

16. In a fluid meter, the combination with displacement mechanism; of means affording a plurality of ports adapted to permit flow to and from said mechanism, each port having a straight outside wall and a curvilinear inner wall; a valve having a plurality of straight sides at its outer edge and having a circular inner edge; means operatively associated with said displacement mechanism for operating said valve; and means for maintaining each outer straight side of said valve in parallelism with the outside straight wall of the respective port controlled; wherein the curvilinear inner wall of each port is formed as intersecting segments of a circle having a radius substantially the same as the radius of the circular inner edge of said valve.

DAVID S. WILLSON.

REFERENCES CITED

The following references are of record in the file of this patent:

UNITED STATES PATENTS

| Number | Name | Date |
| --- | --- | --- |
| 1,977,424 | Blum | Oct. 16, 1934 |
| 1,985,400 | Blum | Dec. 25, 1934 |
| 2,055,710 | Smith | Sept. 29, 1936 |
| 2,233,246 | de Lancey | Feb. 25, 1941 |
| 2,356,273 | Risser | Aug. 22, 1944 |

FOREIGN PATENTS

| Number | Country | Date |
| --- | --- | --- |
| 1,963 | Great Britain | May 16, 1878 |